(12) United States Patent
Inoue et al.

(10) Patent No.: US 7,535,941 B2
(45) Date of Patent: May 19, 2009

(54) DRIVE CURRENT CONTROL CIRCUIT FOR LASER AND OPTICAL DISK DEVICE

(75) Inventors: Takashi Inoue, Yokohama (JP); Akira Nakao, Yokohama (JP); Yasuhiro Hayashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 11/616,576

(22) Filed: Dec. 27, 2006

(65) Prior Publication Data

US 2007/0147450 A1 Jun. 28, 2007

(30) Foreign Application Priority Data

Dec. 28, 2005 (JP) ............................. 2005-379559

(51) Int. Cl.
*H01S 3/00* (2006.01)
(52) U.S. Cl. ................. 372/38.02; 372/38.01; 369/116; 369/47.51
(58) Field of Classification Search ............... 372/38.1, 372/38.01–38.09
See application file for complete search history.

(56) References Cited

U.S. PATENT DOCUMENTS

| | | | | |
|---|---|---|---|---|
| 5,126,994 | A * | 6/1992 | Ogawa et al. ............... | 369/116 |
| 6,222,815 | B1 * | 4/2001 | Nagano ................... | 369/47.51 |
| 6,961,294 | B2 | 11/2005 | Matsui | |
| 2002/0036961 | A1 * | 3/2002 | Eguchi et al. ............ | 369/47.51 |
| 2005/0025031 | A1 | 2/2005 | Kodama et al. | |
| 2005/0058053 | A1 | 3/2005 | Ueno et al. | |

FOREIGN PATENT DOCUMENTS

JP 2003-141735 5/2003

* cited by examiner

*Primary Examiner*—Minsun Harvey
*Assistant Examiner*—Xnning Niu
(74) *Attorney, Agent, or Firm*—Oblon, Spivak, McClelland, Maier & Neustadt, P.C.

(57) ABSTRACT

A laser-drive-current control circuit outputs a drive current indicating signal for indicating a laser drive current for driving a laser light emitting element that emits a laser beam to an optical disk and controls the output of the laser drive current based on a light emission monitor signal. The circuit has a sampling and holding circuit that receives the signal, holds the signal for a predetermined time and then outputs the signal, a recording control pulse generator circuit that generates and outputs a control pulse for controlling the output of the laser drive current at a desired timing and a sample pulse for controlling said sampling and holding circuit at a desired timing based on a modulation signal that specifies marks and spaces on said optical disk; filter circuits that output control data for converging the output signal of said sampling and holding circuit on a desired value; a hold logic circuit that outputs a signal for holding the logic of said filter circuits in synchronization with a write-on signal that specifies recording and reproduction operations on said optical disk; and a bias voltage holding circuit that holds a fixed bias voltage for adjusting said laser drive current, wherein said filter circuits hold the logics thereof according to the output signal of said hold logic circuit, and the laser-drive-current control circuit outputs a plurality of drive current indicating signals that indicate said laser drive current based on the output signals of said filter circuits and a signal indicating said bias voltage held in said bias voltage holding circuit.

6 Claims, 13 Drawing Sheets

DRIVE CURRENT CONTROL CIRCUIT FOR LASER AND OPTICAL DISK DEVICE

CROSS-REFERENCE TO RELATED APPLICATION

This application is based upon and claims the benefit of priority from the prior Japanese Patent Application No. 2005-379559, filed on Dec. 28, 2005, the entire contents of which are incorporated herein by reference.

BACKGROUND OF THE INVENTION

1. Field of the Invention

The present invention relates to a laser-drive-current control circuit for controlling the power of a laser applied to an optical disk, and an optical disk device provided with the laser-drive-current control circuit.

2. Background Art

Conventional optical disk devices can identify various optical disk media and carry out reproduction and recording operations suitable for each medium. For example, the reading power, erasing power and recording power of the laser diode differ among read-only media including CD-ROM and DVD-ROM, recordable media including CD-R and DVD±R, and rewritable media including CD-RW, DVD±RW and DVD-RAM. The optical disk devices have to control the drive current of the laser diode.

For example, a conventional optical disk device has means of identifying each optical disk medium loaded thereto, means of automatically setting the recording (and reproducing) data transfer rate suitable for the identified medium, and means of automatically setting the disk rotation speed suitable for the identified medium (see Japanese Patent Laid-Open No. 2003-141735).

Configured as described above, the optical disk device can automatically set the recording/reproducing transfer rate (and the rotation speed) suitable for the loaded recording medium, record and reproduce video data at high speed and reduce power consumption of the system.

As described above, there are a wide variety of optical disk media standards, and the laser light emission pattern for recording varies with specifications. In addition, even under the same standard, the laser light emission pattern varies with the type of the medium (such as a write-once-read-many medium and a rewritable medium). In addition, the laser light emission pattern varies with the recording speed.

The conventional technique described above is not designed to control the laser power and has a problem that the laser power cannot be controlled to accommodate such a wide variety of laser light emission patterns.

SUMMARY OF THE INVENTION

According one aspect of the present invention, there is provided: a laser-drive-current control circuit that outputs a drive current indicating signal for indicating a laser drive current for driving a laser light emitting element that emits a laser beam to an optical disk and controls the output of the laser drive current based on a light emission monitor signal, which depends on the output current of a photo-detector that measures the laser light emission power of said laser light emitting element, comprising a sampling and holding circuit that receives said light emission monitor signal, holds the light emission monitor signal for a predetermined time and then outputs the light emission monitor signal; a recording control pulse generator circuit that generates and outputs a drive current on/off control pulse for controlling the output of the laser drive current at a desired timing and a sample pulse for controlling said sampling and holding circuit at a desired timing based on a modulation signal that specifies marks and spaces on said optical disk; a plurality of automatic power control filter circuits that output control data for converging the output signal of said sampling and holding circuit on a desired value; a hold logic circuit that outputs a signal for holding the logic of said automatic power control filter circuits in synchronization with a write-on signal that specifies recording and reproduction operations on said optical disk; and a bias voltage holding circuit that holds a fixed bias voltage for adjusting said laser drive current, wherein said automatic power control filter circuits hold the logics thereof according to the output signal of said hold logic circuit, and the laser-drive-current control circuit outputs a plurality of drive current indicating signals that indicate said laser drive current based on the output signals of said automatic power control filter circuits and a signal indicating said bias voltage held in said bias voltage holding circuit.

According another aspect of the present invention, there is provided: an optical disk device, comprising a laser light emitting element for emitting a laser beam to an optical disk; a beam splitter that splits said laser beam; an objective lens for applying part of said split laser beam to said optical disk; a photo-detector that receives part of said split laser beam and measures the laser light emission power of said laser light emitting element; an IV converter circuit that converts the output current of said photo-detector into a light emission monitor signal; a laser-drive-current control circuit that outputs a drive current indicating signal for indicating a laser drive current for driving the laser light emitting element and controls the output of the laser drive current based on a light emission monitor signal, comprising: a sampling and holding circuit that receives said light emission monitor signal, holds the light emission monitor signal for a predetermined time and then outputs the light emission monitor signal; a recording control pulse generator circuit that generates and outputs a drive current on/off control pulse for controlling the output of the laser drive current at a desired timing and a sample pulse for controlling said sampling and holding circuit at a desired timing based on a modulation signal that specifies marks and spaces on said optical disk; a plurality of automatic power control filter circuits that output control data for converging the output signal of said sampling and holding circuit on a desired value; a hold logic circuit that outputs a signal for holding the logic of said automatic power control filter circuits in synchronization with a write-on signal that specifies recording and reproduction operations on said optical disk; and a bias voltage holding circuit that holds a fixed bias voltage for adjusting said laser drive current, wherein said automatic power control filter circuits hold the logics thereof according to the output signal of said hold logic circuit, and the laser-drive-current control circuit outputs a plurality of drive current indicating signals that indicate said laser drive current based on the output signals of said automatic power control filter circuits and a signal indicating said bias voltage held in said bias voltage holding circuit; a system controller that controls said laser-drive-current control circuit to make the laser-drive-current control circuit output a plurality of desired drive current indicating signals; a VI converter circuit that converts said plurality of drive current indicating signals into a plurality of laser drive currents; a plurality of switching circuits that turn on and off the plurality of laser drive currents according to a drive current on/off control pulse output from the recording control pulse generator circuit in said laser-drive-current control circuit; and an adder that sums the laser drive currents output via said switching circuits and outputs the sum to said laser light emitting element.

DETAILED DESCRIPTION

An optical disk device according to the present invention can flexibly carry out reproduction and recording operations on a wide variety of media because it has a laser-drive-current control circuit that can be arbitrarily adapted to each medium.

In the following, an embodiment of the present invention will be described with reference to the drawings.

First Embodiment

Figure 1:
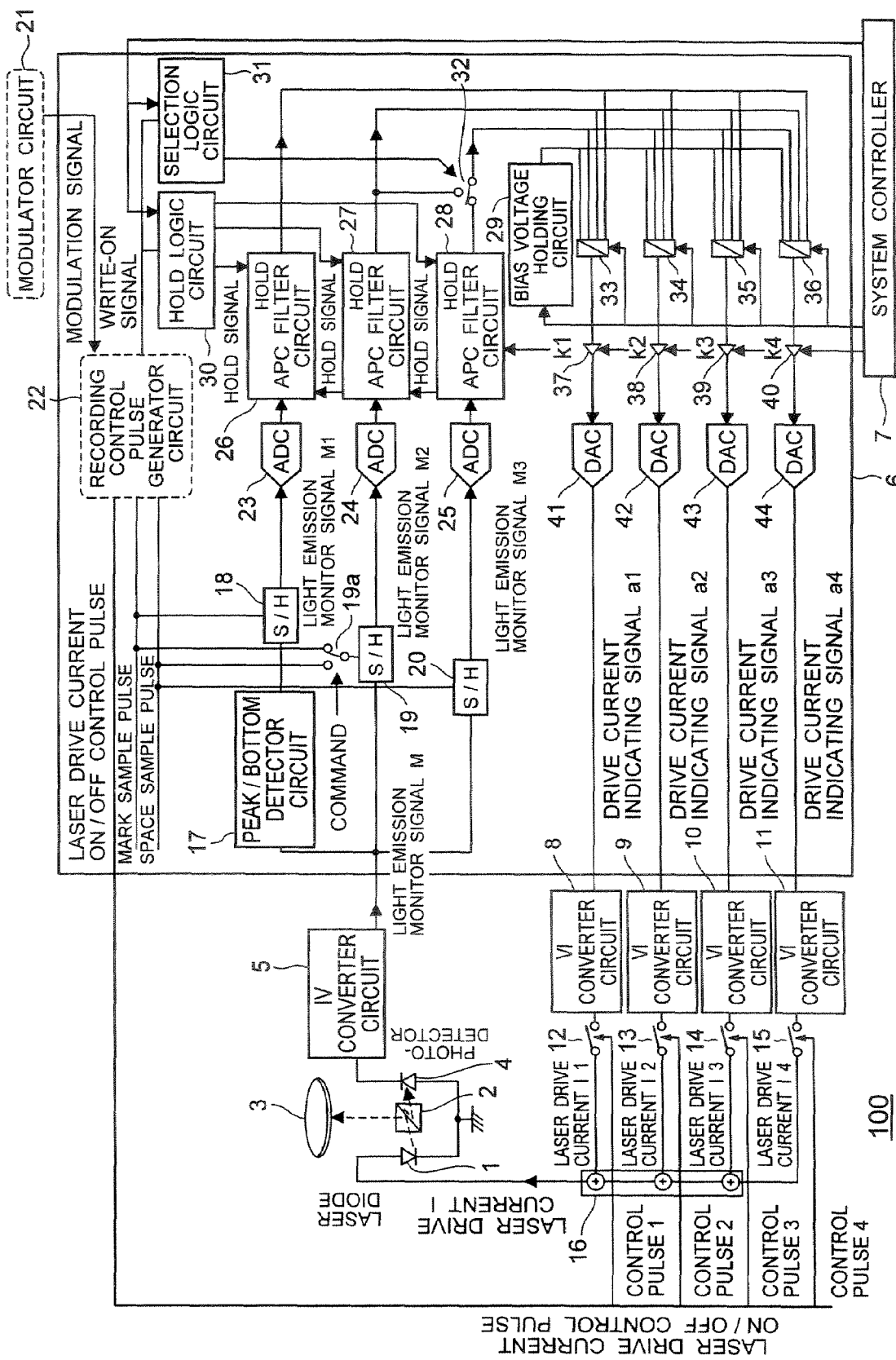
FIG. 1 is a diagram showing a configuration of essential parts of an optical disk device according to a first embodiment of the present invention, which is an aspect of the present invention.

FIG. 1 is a diagram showing a configuration of essential parts of an optical disk device according to a first embodiment of the present invention, which is an aspect of the present invention.

As shown in FIG. 1, an optical disk device 100 has a laser diode 1 which is a laser light emitting element for emitting a laser beam to an optical disk, a beam splitter 2 that splits the laser beam, an objective lens 3 for applying part of the split laser beam to the optical disk, a photo-detector 4 that receives part of the split laser beam, outputs a current in proportion to the emission power of the laser diode 1 and measures the power of the laser light emission of the laser diode 1 (the power applied to the disk through the objective lens 3) and an IV converter circuit 5 that converts the output current of the photo-detector 4 into a light emission monitor signal "M".

In addition, the optical disk device 100 has a laser-drive-current control circuit 6 that outputs drive current indicating signals "a1" to "a4" that indicate laser drive currents for driving the laser diode 1 based on the light emission monitor signal "M" and controls the output laser drive currents, a system controller 7 that controls the laser-drive-current control circuit 6 to make the laser-drive-current control circuit 6 output a plurality of desired drive current indicating signals "a1" to "a4", VI converter circuits 8, 9, 10 and 11 that convert the plurality of drive current indicating signals "a1" to "a4" into a plurality of laser drive currents "I1" to "I4", respectively, a plurality of switching circuits 12, 13, 14 and 15 that turn on the plurality of laser drive currents "I1" to "I4" according to drive current on/off control pulses 1 to 4 output from the laser-drive-current control circuit 6, and an adder 16 that sums the laser drive currents "I1" to "I4" output via the switching circuits 12, 13, 14 and 15 and outputs the total sum to the laser light emitting element 1 as a laser drive current "I".

The system controller 7 controls the laser-drive-current control circuit 6 based on signals read from the optical disk or under predefined conditions.

Figure 2:
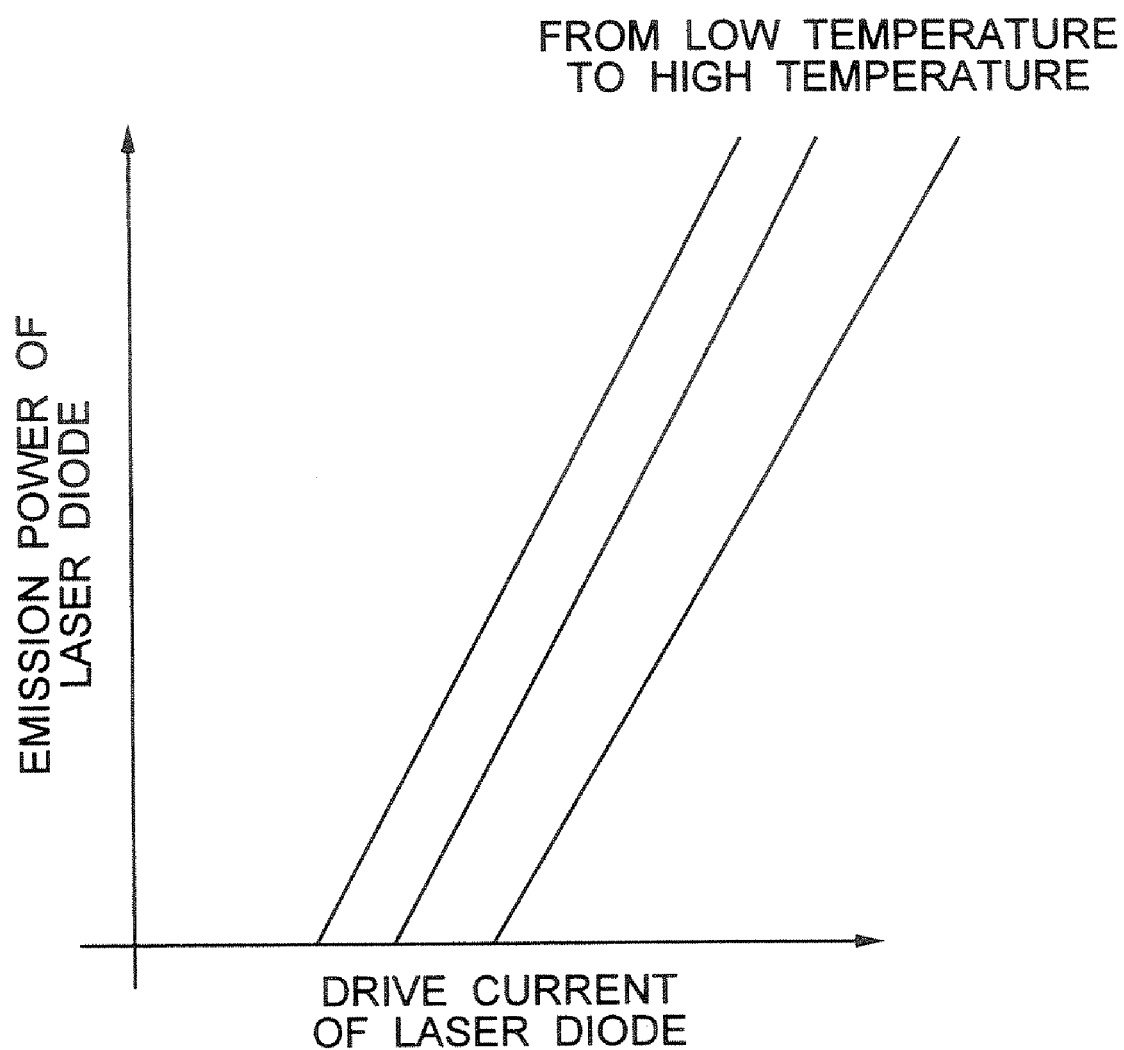
FIG. 2 is a graph showing relationships between the laser drive current for the laser diode and the light emission power of the laser diode at various temperatures.

FIG. 2 is a graph showing relationships between the laser drive current "I" for the laser diode 1 and the light emission power of the laser diode 1 at various temperatures.

As shown in FIG. 2, when a constant current is applied to the laser diode 1, the emission power varies depending on temperature. Thus, the laser-drive-current control circuit 6 monitors the emission power and adjusts the laser drive current "I" to keep the emission power constant.

Specifically, the laser-drive-current control circuit 6 outputs the drive current indicating signals "a1" to "a4" indicating laser drive currents for driving the laser diode 1 based on the light emission monitor signal "M", which depends on the output current of the photo-detector that measures the laser light emission power of the laser light emitting element that emits a laser beam to the optical disk, and controls the output laser drive current "I".

Furthermore, the laser-drive-current control circuit 6 has a peak/bottom detector circuit 17 that detects a peak and a bottom of the light emission monitor signal "M", a first sampling and holding circuit 18 that outputs the signal detected by the peak/bottom detector circuit 17 after holding the signal for a desired time, second and third sampling and holding circuits 19 and 20 that receive the light emission monitor signal "M" and output the signal "M" after holding the signal for a desired time, and a recording control pulse generator circuit 22 that generates a drive current on/off control pulse for controlling the output of the laser drive current at a desired timing, and a mark sample pulse and a space sample pulse for controlling the first to third sampling and holding circuits 18, 19 and 20 at desired timings based on a modulation signal that specifies marks and spaces on the optical disk output from a modulator circuit 21 and outputs the pulses.

The first sampling and holding circuit 18 samples and holds part of the signal detected by the peak/bottom detector circuit which corresponds to marks on the optical disk under the control of the mark sample pulse and outputs a light emission monitor signal "M1".

The second sampling and holding circuit 19 is connected to a switching circuit 19a, and the mark sample pulse or the space sample pulse is selectively input to the second sampling and holding circuit 19 under the instruction of the system controller 7, for example. In the case where the second sampling and holding circuit 19 is controlled by the mark sample pulse, the second sampling and holding circuit 19 samples and holds a part of the light emission monitor signal "M" which corresponds to marks on the optical disk and outputs a light emission monitor signal "M2". On the other hand, in the case where the second sampling and holding circuit 19 is controlled by the space sample pulse, the second sampling and holding circuit 19 samples and holds a part of the light emission monitor signal "M" which corresponds to spaces on the optical disk and outputs a light emission monitor signal "M2".

The third sampling and holding circuit 20 samples and holds a part of the light emission monitor signal "M" which corresponds to spaces on the optical disk under the control of the space sample pulse and outputs a light emission monitor signal "M3".

The first to third sampling and holding circuits 18 to 20 are analog circuits.

Furthermore, the laser-drive-current control circuit 6 has analog-to-digital converters 23, 24 and 25 that converts the light emission monitor signals "M1" to "M3" output from the first to third sampling and holding circuits 18 to 20 from analog to digital form, first to third automatic power control (APC) filter circuits 26, 27 and 28 that output control data for converging the signals converted from the light emission monitor signals "M1" to "M3" output from the analog-to-digital converters 23 to 25 on a desired value, and a bias voltage holding circuit 29 that holds a fixed bias voltage for adjusting the laser drive current The bias voltage holding circuit 29 holds the bias voltage indicated by the system controller 7, for example.

Furthermore, the laser-drive-current control circuit 6 has a hold logic circuit 30 that outputs a hold signal for holding the logic of the first to third APC filter circuits 26 to 28 to the first to third APC filter circuits 26 to 28 in synchronization with a write-on signal that specifies recording and reproduction operations on the optical disk under the instruction of the system controller 7, a selection logic circuit 31 that outputs a switching signal to switch between the outputs of the second and third APC filter circuits in synchronization with the write-on signal that specifies recording and reproduction operations on the optical disk under the instruction of the system controller 7, for example, and a switching circuit 32 that switches between the outputs of the second and third APC filter circuits based on the switching signal and outputs the selected signal.

The write-on signal described above is generated by the recording control pulse generator circuit 22 so that the timing thereof with respect to the laser drive current on/off control pulse can be adjusted.

The selection logic circuit 31 and the switching circuit 32 allow either the second or third APC filter circuit 27 or 28 to be selected for use in synchronization with the recording and reproduction operations on the optical disk, and the laser-drive-current control circuit 6 can be modified to operate according to specifications of the laser light emission pattern in the recording and reproduction operations on the optical disk.

Furthermore, the laser-drive-current control circuit 6 has a plurality of output selecting circuits 33, 34, 35 and 36 that selects and outputs one of the output signals of the first to third APC filter circuits 26 to 28 and the bias voltage signal held in the bias voltage holding circuit 29, a plurality of scaling-factor setting circuits 37, 38, 39 and 40 that output the outputs of the output selecting circuits 33, 34, 35 and 36 multiplied by desired scaling factors (k1, k2, k3, k4), respectively, and digital-to-analog converters 41, 42, 43 and 44 that convert the output signals of the scaling-factor setting circuits 37 to 40 from digital to analog form and output the drive current indicating signals "a1" to "a4", respectively Since the output selecting circuits 33 to 36 and the plurality of scaling-factor setting circuits 37 to 40 are controlled by the system controller 7, the output signals of the APC filters and the bias current indicating signal are supplied to the VI converter circuits 8 to 11 as laser drive current indicating signals after being multiplied by scaling factors that can be arbitrarily set. In addition, by controlling the output selecting circuits 33 to 36, the scaling-factor setting circuits 37 to 40 and the switching circuits 12 to 15, the laser drive current "I" can be controlled to make the laser diode 1 output laser beams in various light emission patterns that comply with the laser light emission pattern specifications for recording and reproduction of various optical disks.

Figure 3:
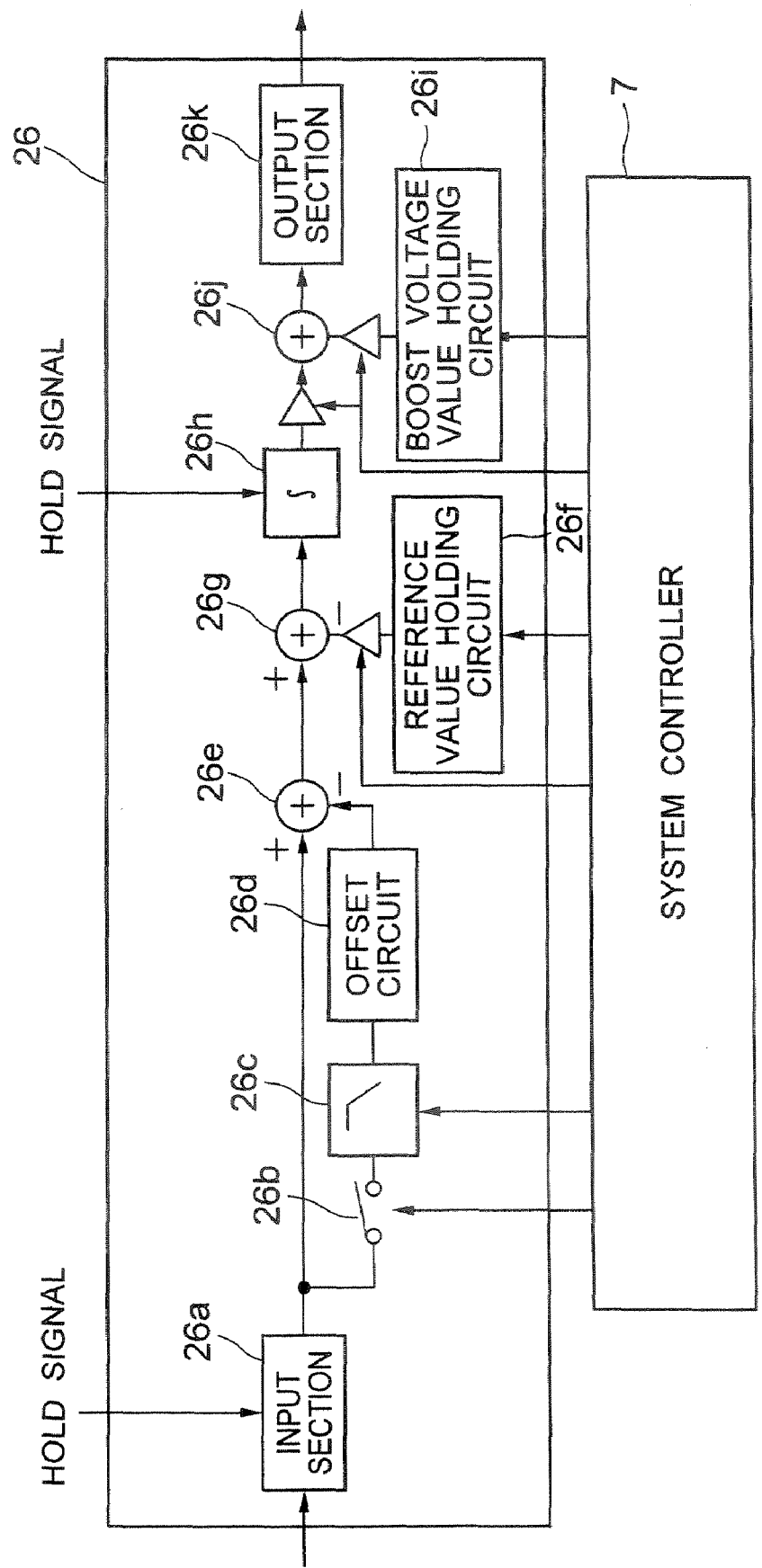
FIG. 3 is a diagram showing an arrangement of essential parts of the APC filter circuit and the system controller shown in FIG. 1.

Now, a configuration of the APC filter circuit described above will be described in detail. FIG. 3 is a diagram showing an arrangement of essential parts of the APC filter circuit and the system controller shown in FIG. 1. Although the first APC filter circuit 26 will be particularly described in the following, the second and third APC filter circuits 27 and 28 are configured the same.

As shown in FIG. 3, the first APC filter circuit 26 has an input section 26a to which the output of the sampling and holding circuit 18 (the light emission monitor signal "M1" converted from analog to digital form) is input, an offset circuit 26d that measures and stores the offset voltage of the output of the sampling and holding circuit 18 at the time when a switching circuit 26b and a low-pass filter circuit 26c are controlled by the system controller 7 to prevent laser light emission, and an offset correction circuit 26e that carries out offset correction by subtracting the offset voltage stored in the offset circuit 26d from the output of the sampling and holding circuit 18 at the time when laser light emission occurs (the light emission monitor signal "M1" converted from analog to digital form).

For example, when laser light emission does not occur, the switching circuit 26b is turned on under the control of the system controller 7, and the offset circuit 26d measures and stores the input offset voltage. On the other hand, when laser light emission occurs, the switching circuit 26b is turned off under the control of the system controller 7, and a new signal is not input to the offset circuit 26d.

Furthermore, the first APC filter circuit 26 has a first calculation circuit 26g that compares the value corrected by the offset correction circuit 26e with a reference value held by a reference value holding circuit 26f to calculate the error thereof, an integrating circuit 26h that integrates the error calculated by the first calculation circuit 26g, a second calculation circuit 26j that adds a boost voltage value held by a boost voltage value holding circuit 26i to the output of the integrating circuit 26h and outputs the sum and an output section 26k that outputs the output of the second calculation circuit 26j to the output selecting circuits 33 to 36.

The system controller 7 makes the reference value holding circuit 26f hold the reference value, which is a target value, and output the reference value multiplied by a desired scaling factor to the first calculation circuit 26g. In addition, the system controller 7 makes the boost voltage value holding circuit 26i hold the boost voltage value and makes the integrating circuit 26h and the boost voltage value holding circuit 26i output the respective outputs multiplied by a desired scaling factor.

The first APC filter circuit 26 thus configured outputs control data that makes the light emission monitor signal "M1" converted from analog to digital form be a desired value.

For example, when the switching circuits 12 to 15 shown in FIG. 1 are turned off, the feedback loop including the first APC filter circuit 26 is opened. At this time, although the analog sampling and holding circuits 18 to 20 are held, the hold voltages thereof gradually vary because of the leak current from the holding circuits. Furthermore, if the loop is opened, the feedback control is removed, so that the control to reduce the error from the target value is removed. Thus, if the integrating circuit 26h continues the integration, the output section 26k outputs an unexpected signal, and the data at the input section 26a is kept at the maximum or minimum value. By simultaneously inputting the hold signal described above to the input section 26a and the integrating circuit 26h to fix the logic, the output of the output section 26k can be maintained at the value at the time when the hold signal is input.

Now, a relationship among the light emission monitor signal of the optical disk device 100 configured as described above, the laser drive current, and waveforms of pulses for controlling the laser-drive-current control circuit will be described.

Figure 4:
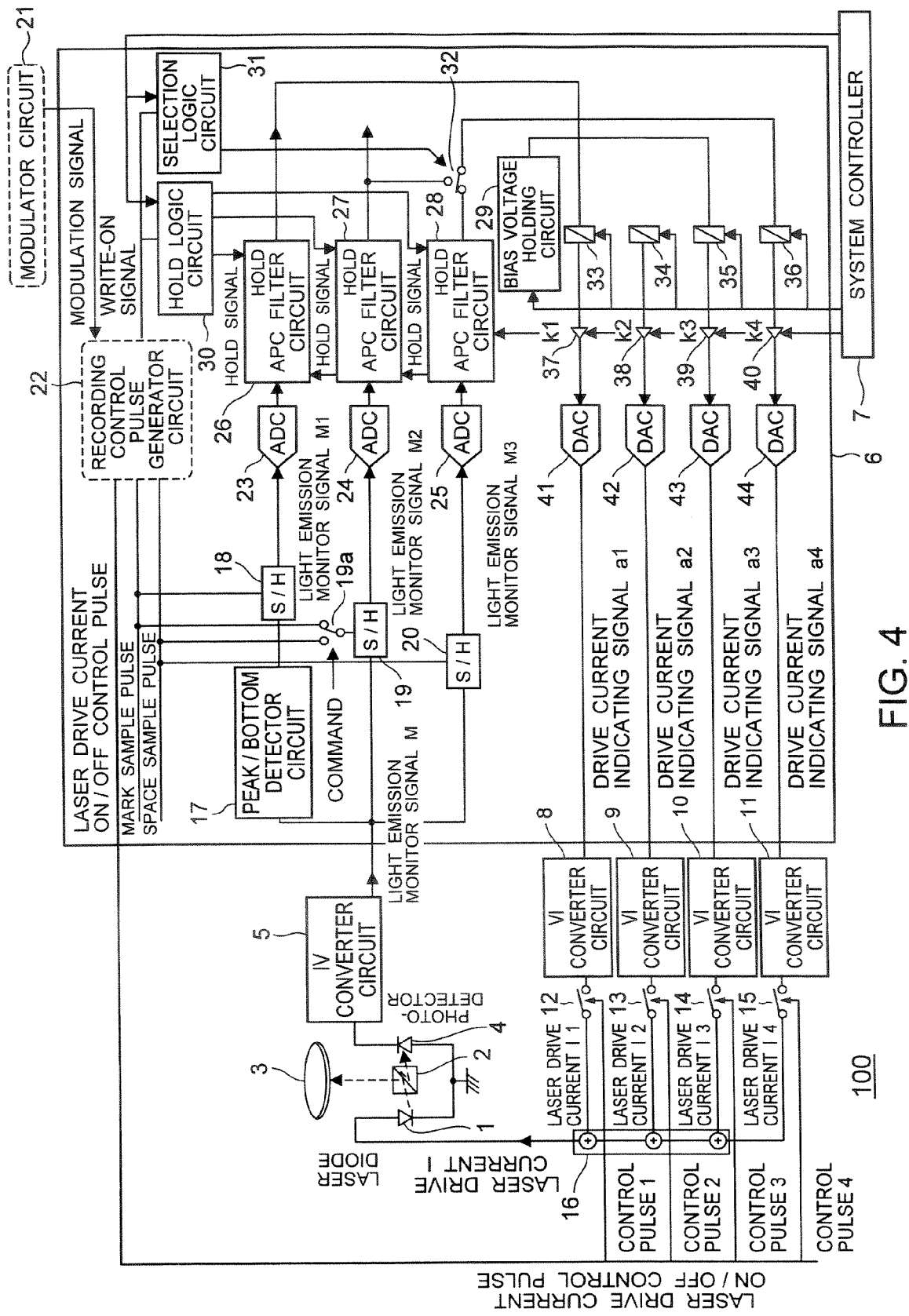
FIG. 4 shows an example 1 of modification of the laser-drive-current control circuit of the optical disk device according to the first embodiment, which is an aspect of the present invention.
Figure 5:
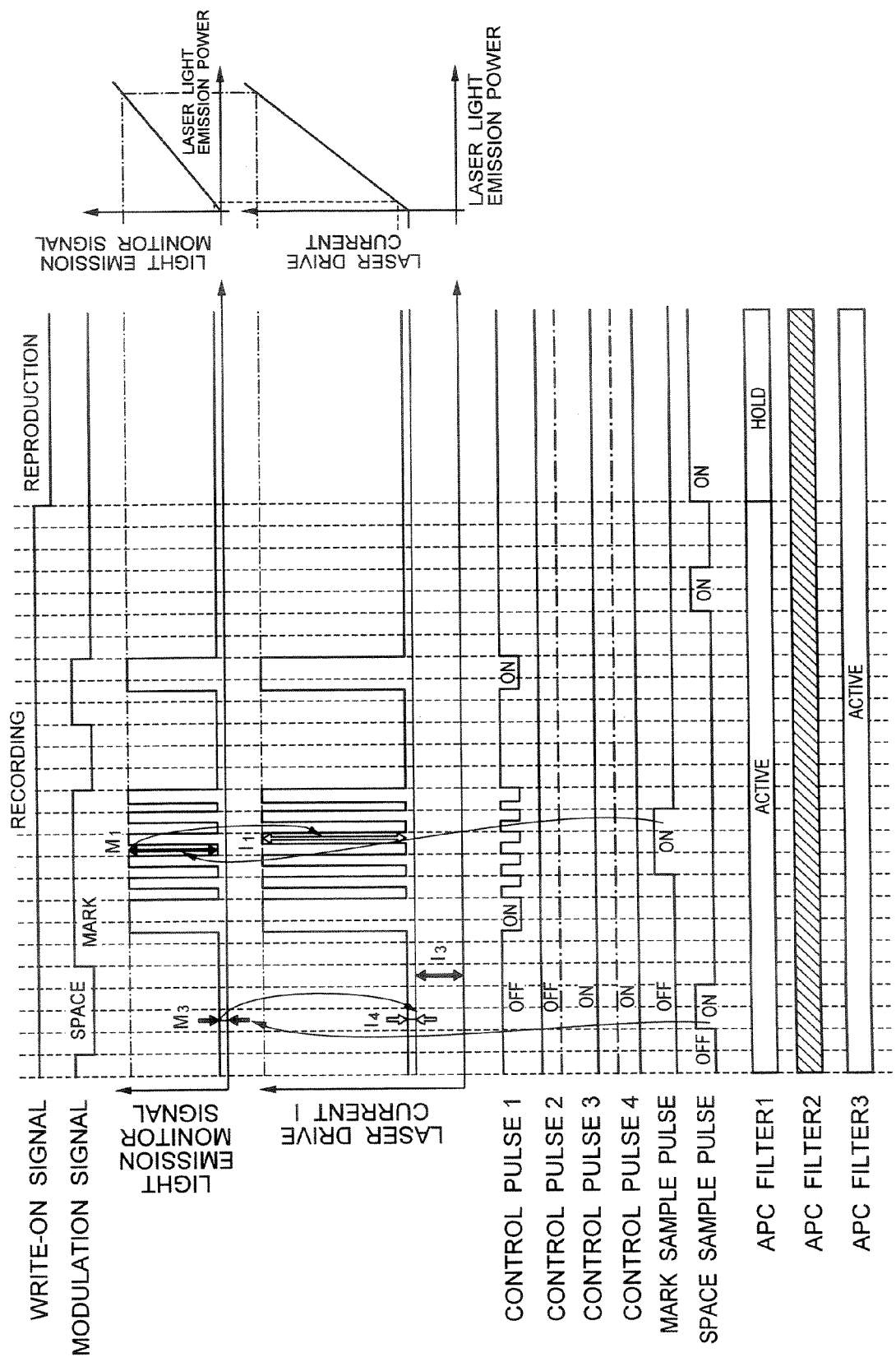
FIG. 5 is a diagram for illustrating the light emission monitor signal, the laser drive current and the waveforms of pulses for controlling the laser-drive-current control circuit shown in FIG. 4.

FIG. 4 shows an example 1 of modification of the laser-drive-current control circuit of the optical disk device according to the first embodiment, which is an aspect of the present invention. FIG. 5 is a diagram for illustrating the light emission monitor signal, the laser drive current and the waveforms of pulses for controlling the laser-drive-current control circuit shown in FIG. 4 (in the case of application to lower-speed recording of a DVD±R).

As shown in FIG. 4, the system controller 7 controls the output selecting circuits 33 to 36 in such a manner that the output of the first APC filter circuit 26 is input to the output selecting circuit 33, the output of the third APC filter circuit 28 is input to the output selecting circuit 36, and the output of the bias voltage holding circuit 29 is input to the output selecting circuit 35. The output of the second APC filter circuit 27 is not used by any output selecting circuit.

If the connections in the laser-drive-current control circuit 6 are arranged in this way, the first APC filter circuit 26 calculates the control data for correcting the light emission monitor signal "M1" sampled and held in synchronization with the mark sample pulse indicating the mark (pit) positions to a desired value, thereby correcting the laser drive current "I1", and the third APC filter circuit 28 calculates the control data for correcting the light emission monitor signal "M3" sampled and held by the third sampling and holding circuit 20 in synchronization with the space sample pulse indicating the space positions to a desired value, thereby correcting the laser drive current "I4". These corrections are made on the assumption that the laser drive current "I3" is fixed to a desired value by the fixed bias voltage (the same holds true for the examples described below).

As shown in FIG. 5, if the write-on signal is a signal that specifies the recording operation, the third sampling and holding circuit 20 samples and holds the light emission monitor signal "M3" in synchronization with the space sample pulse, the third APC filter circuit 28 calculates the control data for correcting the light emission monitor signal "M3" to a desired value, and as a result, the laser drive current "I4" is corrected to a desired value. Then, when the control pulses 3 and 4 are turned on, the switching circuits 13 and 14 are turned on, and the laser drive current "I", which is the sum of the laser drive currents "I3" and "I4", is output.

Furthermore, the first sampling and holding circuit 18 samples and holds the light emission monitor signal "M1" in synchronization with the mark sample pulse, and the first APC filter circuit 26 calculates the control data for correcting the light emission monitor signal "M1" to a desired value, and as a result, the laser drive current "I1" is corrected to a desired value. Then, when the control pulses 1 and 3 are turned on, the switching circuits 12 and 14 are turned on, and the laser drive current "I", which is the sum of the laser drive currents "I1" and "I3", is output.

On the other hand, if the write-on signal is a signal that specifies the reproduction operation, the control pulse 1 is always kept in the off state, and the feedback loop including the first APC filter circuit 26 is opened. Thus, in order that the first APC filter circuit 26 can output a desired value (a signal in the steady state during the preceding recording operation) when resuming the recording operation, the hold logic circuit 30 outputs a hold signal to the first APC filter circuit 26 in synchronization with a change of the write-on signal to a signal that specifies the reproduction operation, thereby holding the logic of the first APC filter circuit 26.

The control pulse 4 is always in the on state, and thus the feedback loop including the third APC filter circuit 28 is closed. Therefore, the logic of the first APC filter circuit 26 is kept in the steady state, so that there is no need to use the hold signal to hold the logic.

Figure 6:
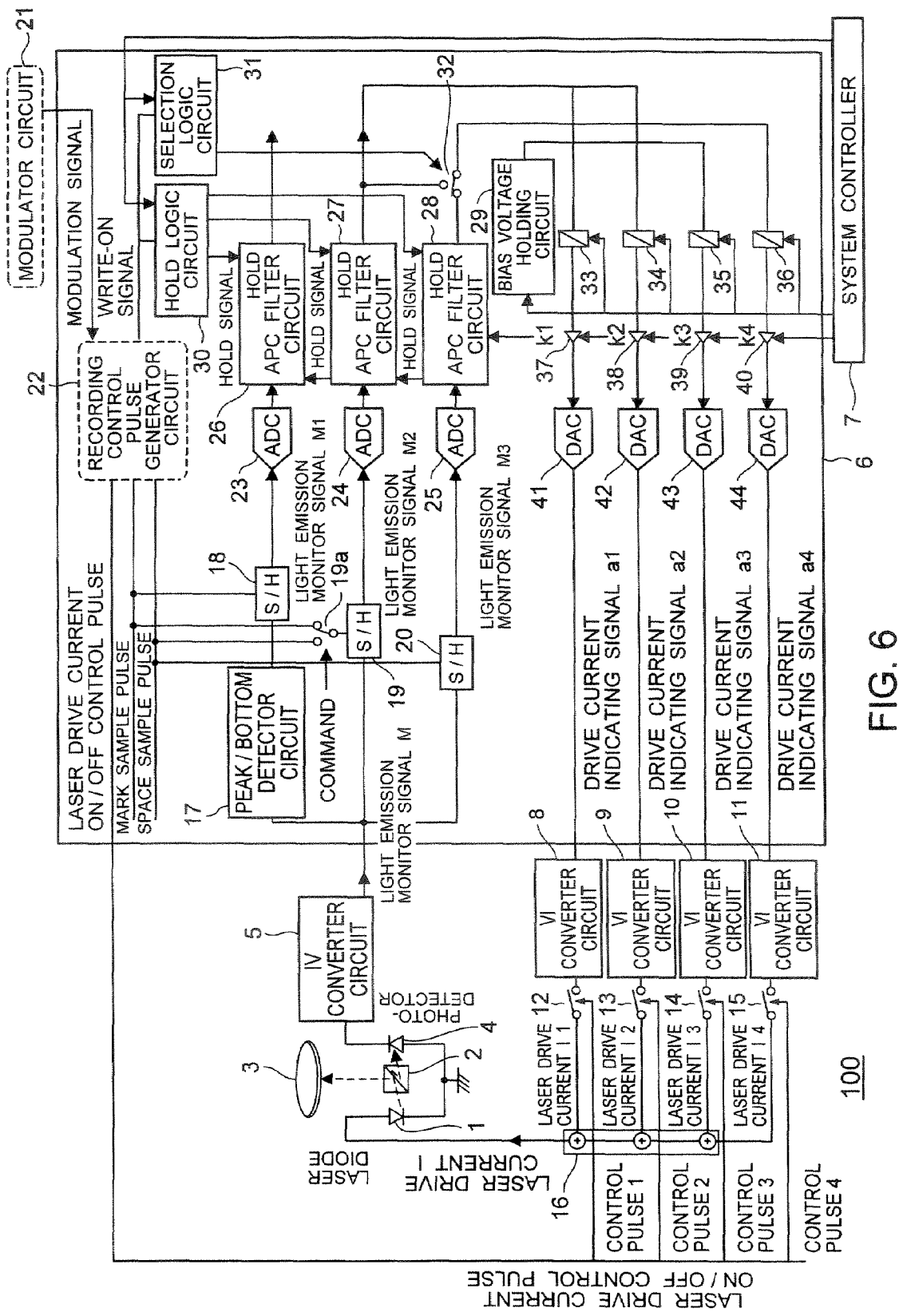
FIG. 6 shows an example 2 of modification of the laser-drive-current control circuit of the optical disk device according to the first embodiment, which is an aspect of the present invention.
Figure 7:
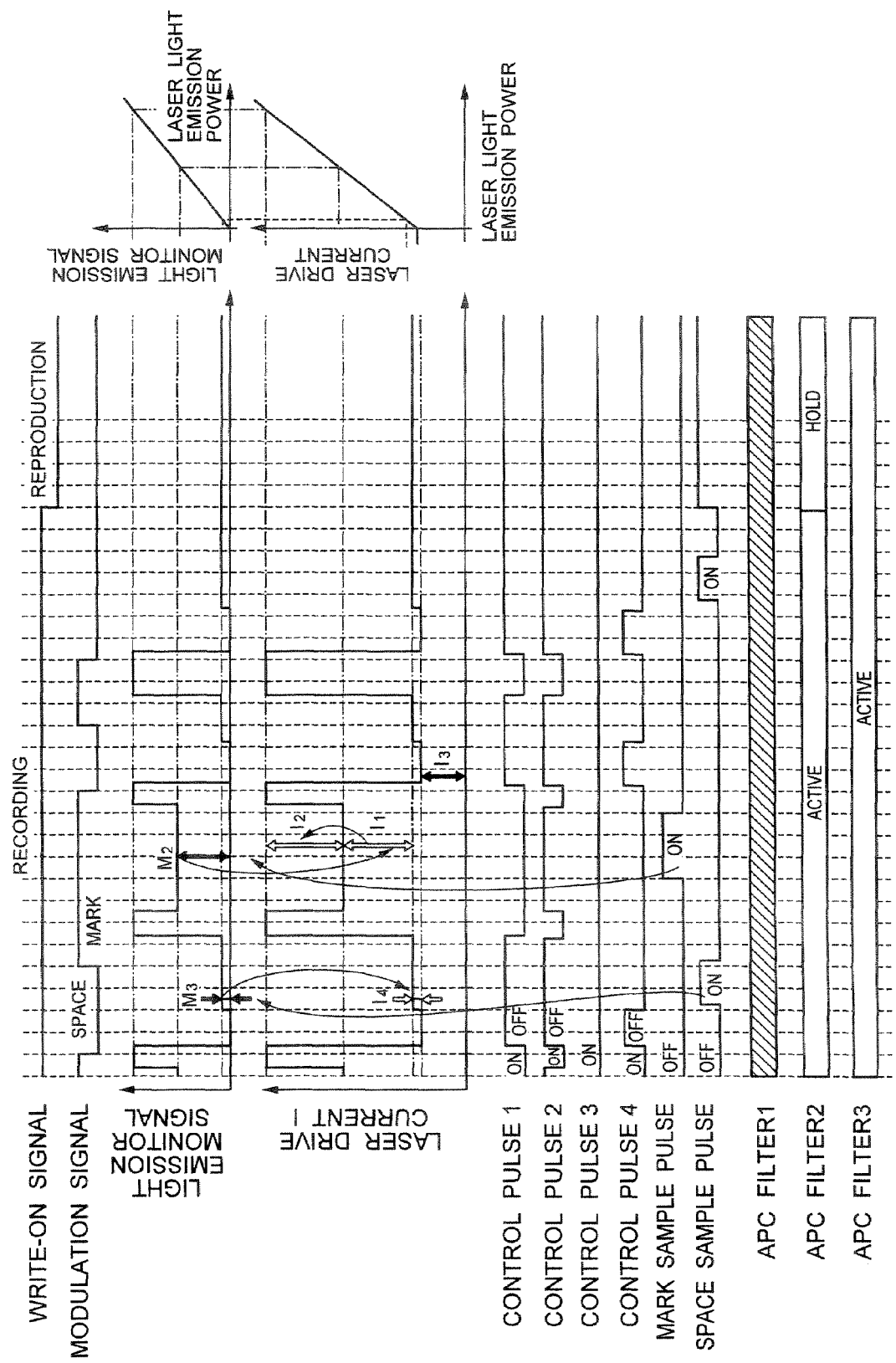
FIG. 7 is a diagram for illustrating the light emission monitor signal, the laser drive current and the waveforms of pulses for controlling the laser-drive-current control circuit shown in FIG. 6.

FIG. 6 shows an example 2 of modification of the laser-drive-current control circuit of the optical disk device according to the first embodiment, which is an aspect of the present invention. FIG. 7 is a diagram for illustrating the light emission monitor signal, the laser drive current and the waveforms of pulses for controlling the laser-drive-current control circuit shown in FIG. 6 (in the case of application to higher-speed recording of a DVD±R).

As shown in FIG. 6, the system controller 7 controls the output selecting circuits 33 to 36 in such a manner that the output of the second APC filter circuit 27 is input to the output selecting circuits 33 and 34, the output of the third APC filter circuit 28 is input to the output selecting circuit 36, and the output of the bias voltage holding circuit 29 is input to the output selecting circuit 35. The output of the first APC filter circuit 26 is not used by any output selecting circuit. Furthermore, the switching circuit 19a is set so that the mark sample pulse is input to the second sampling and holding circuit 19.

If the connections in the laser-drive-current control circuit 6 are arranged in this way, the second APC filter circuit 27 calculates the control data for correcting the light emission monitor signal "M2" sampled and held by the second sampling and holding circuit 19 in synchronization with the mark sample pulse indicating the mark positions to a desired value, thereby correcting the laser drive current "I1", and the third APC filter circuit 28 calculates the control data for correcting the light emission monitor signal "M3" sampled and held by the third sampling and holding circuit 20 in synchronization with the space sample pulse indicating the space positions to a desired value, thereby correcting the laser drive current "I4".

As shown in FIG. 7, if the write-on signal is a signal that specifies the recording operation, the light emission monitor signal "M3" is sampled and held in synchronization with the space sample pulse, the third APC filter circuit 28 calculates the control data for correcting the light emission monitor signal "M3" to a desired value, and as a result, the laser drive current "I4" is corrected to a desired value. Then, since the control pulses 3 and 4 are turned on, the switching circuits 14 and 15 are turned on, and the laser drive current "I", which is the sum of the laser drive currents "I3" and "I4", is output.

Furthermore, the light emission monitor signal "M2" is sampled and held in synchronization with the mark sample pulse, and the second APC filter circuit 27 calculates the control data for correcting the light emission monitor signal "M2" to a desired value, and as a result, the laser drive current "I1" is corrected to a desired value. Here, the laser drive current "I2" is set to meet the condition that I1:I2=k1:k2, where "k1" and "k2" are the scaling factors of the scaling-factor setting circuits 37 and 38, respectively. Then, when the control pulses 1 to 4 are turned on, the switching circuits 12 to 15 are turned on, and the laser drive current "I" which is the sum of the laser drive currents "I1" to "I4", is output. For example, the scaling factors "k1" and "k2" of the scaling-factor setting circuits 37 and 38 are indicated by the system controller 7.

On the other hand, if the write-on signal is a signal that specifies the reproduction operation, the control pulse 2 is always kept in the off state, and the feedback loop including the second APC filter circuit 27 is opened. Thus, as in the example 1, the hold logic circuit 30 outputs a hold signal to the second APC filter circuit 27 in synchronization with a change of the write-on signal to a signal that specifies the reproduction operation, thereby holding the logic of the second APC filter circuit 27.

The control pulse 4 is always in the on state, and thus the feedback loop including the third APC filter circuit 28 is closed. Therefore, as in the example 1, there is no need to use the hold signal to hold the logic of the third APC filter circuit 28.

Figure 8:
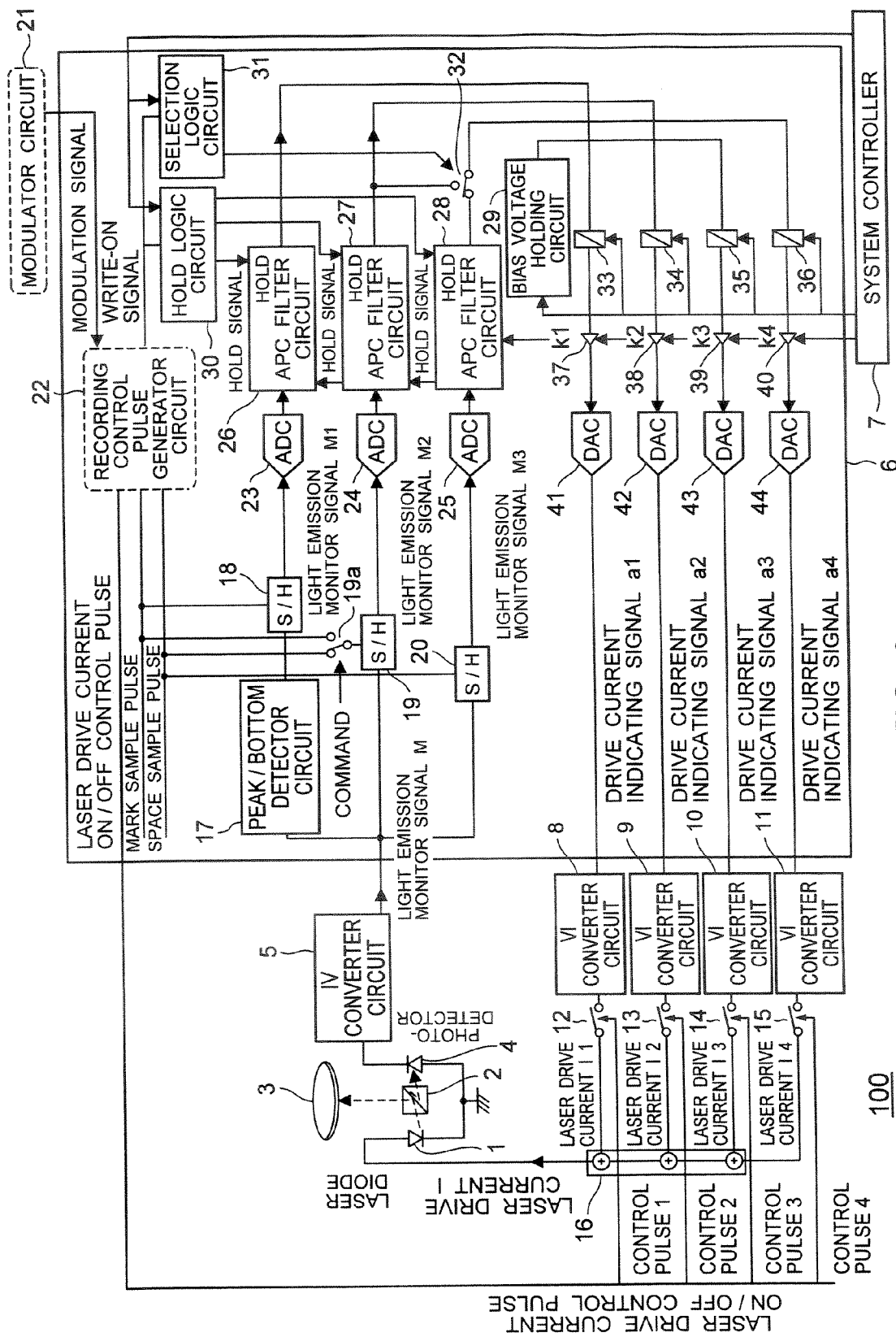
FIG. 8 shows an example 3 of modification of the laser-drive-current control circuit of the optical disk device according to the first embodiment, which is an aspect of the present invention.
Figure 9:
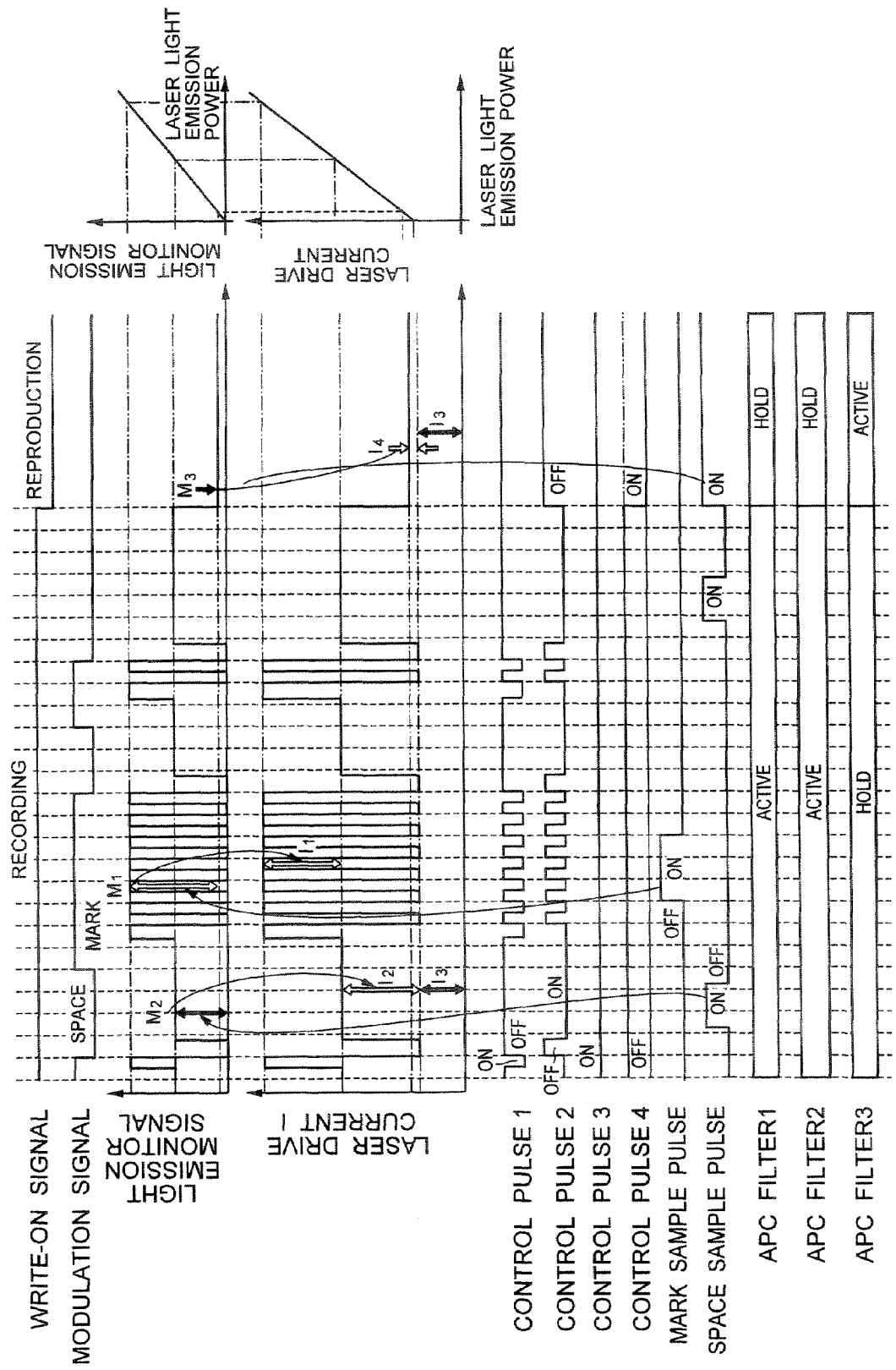
FIG. 9 is a diagram for illustrating the light emission monitor signal, the laser drive current and the waveforms of pulses for controlling the laser-drive-current control circuit shown in FIG. 8.

FIG. 8 shows an example 3 of modification of the laser-drive-current control circuit of the optical disk device according to the first embodiment, which is an aspect of the present invention. FIG. 9 is a diagram for illustrating the light emission monitor signal, the laser drive current and the waveforms of pulses for controlling the laser-drive-current control circuit shown in FIG. 8 (in the case of application to a DVD-RW).

As shown in FIG. 8, the system controller 7 controls the output selecting circuits 33 to 36 in such a manner that the output of the first APC filter circuit 26 is input to the output selecting circuit 33, the output of the second APC filter circuit 27 is input to the output selecting circuit 34, the output of the third APC filter circuit 28 is input to the output selecting circuit 36, and the output of the bias voltage holding circuit 29 is input to the output selecting circuit 35. The switching circuit 19a is set so that the space sample pulse is input to the second sampling and holding circuit 19.

If the connections in the laser-drive-current control circuit 6 are arranged in this way, the first APC filter circuit 26 calculates the control data for correcting the light emission monitor signal "M1" sampled and held by the first sampling and holding circuit 18 in synchronization with the mark sample pulse indicating the mark positions to a desired value, thereby correcting the laser drive current "I1", the second APC filter circuit 27 calculates the control data for correcting the light emission monitor signal "M2" sampled and held by the second sampling and holding circuit 19 in synchronization with the space sample pulse indicating the space positions to a desired value, thereby correcting the laser drive current "I2" and the third APC filter circuit 28 calculates the control data for correcting the light emission monitor signal "M3" sampled and held by the third sampling and holding circuit 20 in synchronization with the space sample pulse indicating the space positions to a desired value, thereby correcting the laser drive current "I4".

As shown in FIG. 9, if the write-on signal is a signal that specifies the recording operation, the light emission monitor signal "M2" is sampled and held in synchronization with the space sample pulse, the second APC filter circuit 27 calculates the control data for correcting the light emission monitor signal "M2" to a desired value, and as a result, the laser drive current "I2" is corrected to a desired value.

Furthermore, the light emission monitor signal "M1" is sampled and held in synchronization with the mark sample pulse, the first APC filter circuit 26 calculates the control data for correcting the light emission monitor signal "M1" to a desired value, and as a result, the laser drive current "I1" is corrected to a desired value. This correction is made on the assumption that the laser drive current "I2" has been corrected to a desired value with the correction means described above. Then, when the control pulses 1 to 3 are turned on, the switching circuits 12 to 14 are turned on, and the laser drive current "I", which is the sum of the laser drive currents "I1" to "I3", is output.

The laser drive current "I4" used for reproduction is not used for recording. Thus, as in the example 1, the hold logic circuit 30 outputs a hold signal to the third APC filter circuit 28 in synchronization with a change of the write-on signal to a signal that specifies the recording operation, thereby holding the logic of the third APC filter circuit 28.

On the other hand, if the write-on signal is a signal that specifies the reproduction operation, the control pulses 1 and 2 are always kept in the off state, and the feedback loops including the first and second APC filter circuits 26 and 27 are opened. Thus, as in the example 1, the hold logic circuit 30 outputs a hold signal to the first and second APC filter circuits 26 and 27 in synchronization with a change of the write-on signal to a signal that specifies the reproduction operation, thereby holding the logic of the first and second APC filter circuits 26 and 27.

The light emission monitor signal "M3" is sampled and held in synchronization with the space sample pulse, the third APC filter circuit 28 calculates the control data for correcting the light emission monitor signal "M3" to a desired value, and as a result, the laser drive current "I4" is corrected to a desired value. Then, when the control pulses 3 and 4 are turned on, the switching circuits 14 and 15 are turned on, and the laser drive current "I", which is the sum of the laser drive currents "I3" and "I4", is output.

Figure 10:
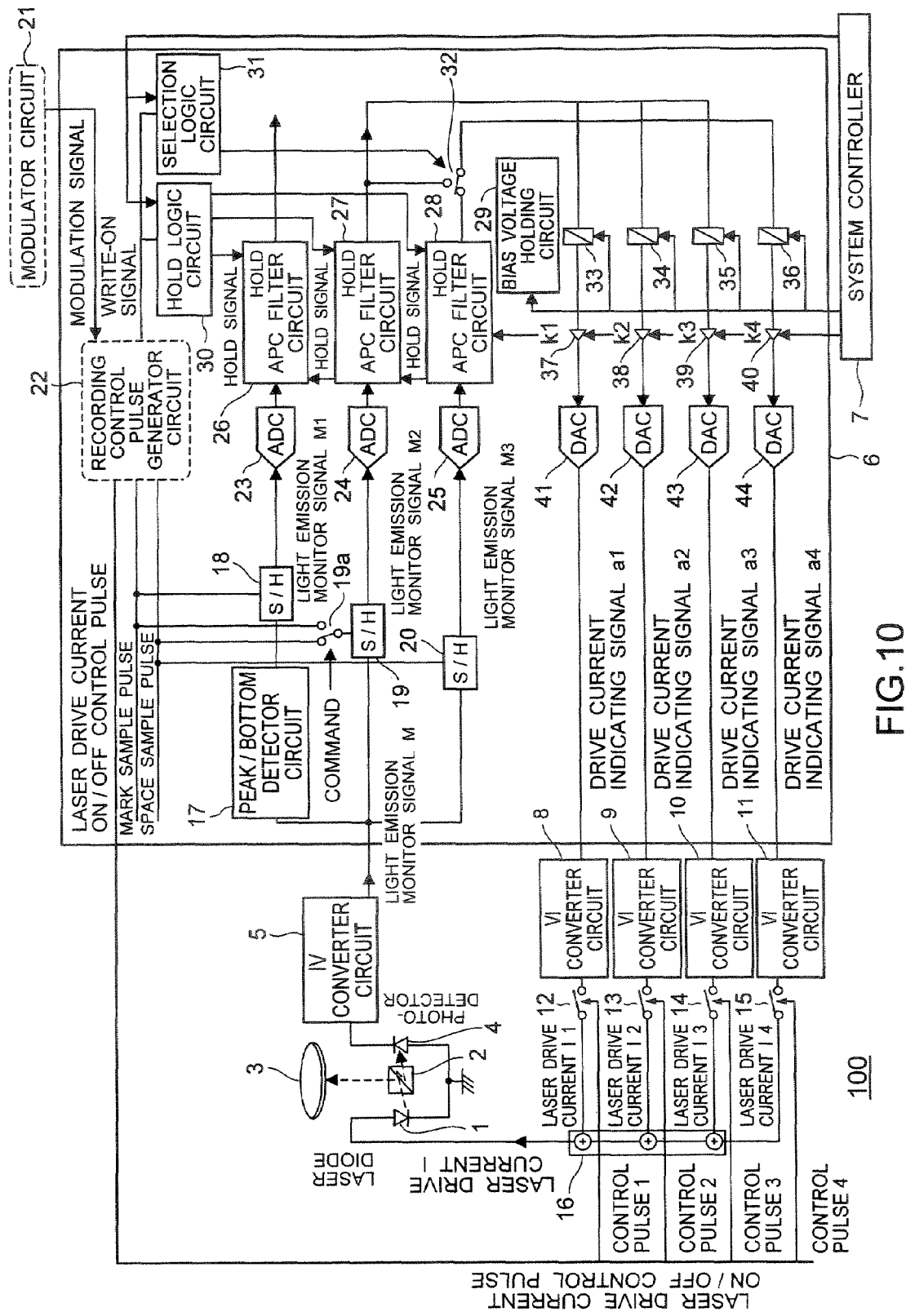
FIG. 10 shows an example 4 of modification of the laser-drive-current control circuit of the optical disk device according to the first embodiment, which is an aspect of the present invention.
Figure 11:
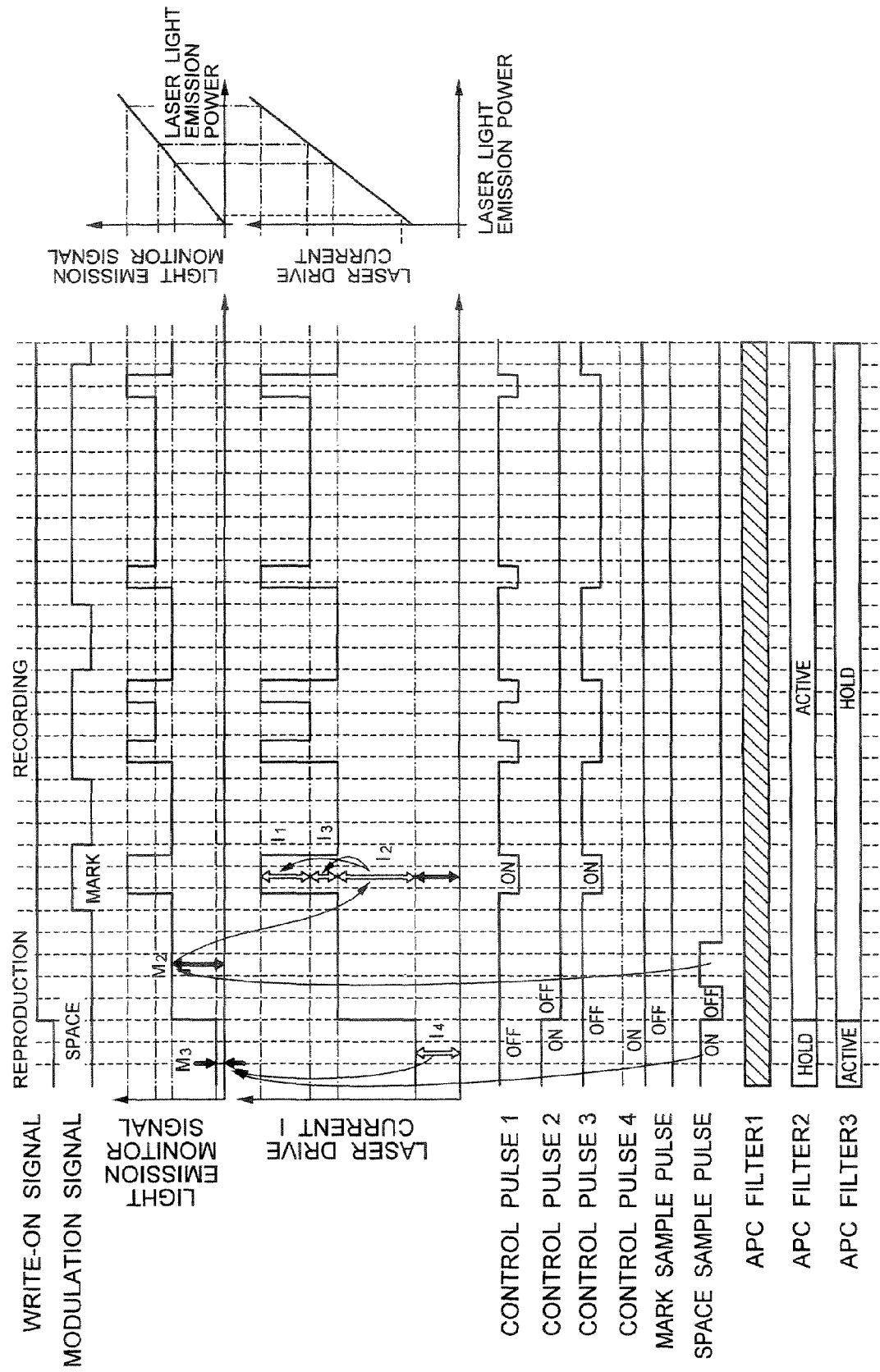
FIG. 11 is a diagram for illustrating the light emission monitor signal, the laser drive current and the waveforms of pulses for controlling the laser-drive-current control circuit shown in FIG. 10.

FIG. 10 shows an example 4 of modification of the laser-drive-current control circuit of the optical disk device according to the first embodiment, which is an aspect of the present invention. FIG. 11 is a diagram for illustrating the light emission monitor signal, the laser drive current and the waveforms of pulses for controlling the laser-drive-current control circuit shown in FIG. 10 (in the case of application to a DVD-RAM).

As shown in FIG. 10, the system controller 7 controls the output selecting circuits 33 to 36 in such a manner that the output of the second APC filter circuit 27 is input to the output selecting circuits 33 to 35, and the output of the third APC filter circuit 28 is input to the output selecting circuit 36. The switching circuit 19a is set so that the space sample pulse is input to the second sampling and holding circuit 19.

If the connections in the laser-drive-current control circuit 6 are arranged in this way, the second APC filter circuit 27 calculates the control data for correcting the light emission monitor signal "M2" sampled and held by the second sampling and holding circuit 19 in synchronization with the space sample pulse indicating the space positions to a desired value, thereby correcting the laser drive current "I2", and the third APC filter circuit 28 corrects the light emission monitor signal "M3" sampled and held by the third sampling and holding circuit 20 in synchronization with the space sample pulse indicating the space positions to a desired value, thereby correcting the laser drive current "I4".

As shown in FIG. 11, if the write-on signal is a signal that specifies the reproduction operation, the light emission monitor signal "M3" is sampled and held in synchronization with the space sample pulse, the third APC filter circuit 28 calculates the control data for correcting the light emission monitor signal "M3" to a desired value, and as a result, the laser drive current "I4" is corrected to a desired value.

The laser drive current "I2" used for recording (erasing) is not used for reproduction. Thus, the hold logic circuit 30 outputs a hold signal to the second APC filter circuit 27 in synchronization with a change of the write-on signal to a signal that specifies the reproduction operation, thereby holding the logic of the third APC filter circuit 28 as the initial value of the following recording.

On the other hand, if the write-on signal is a signal that specifies the recording operation, the hold logic circuit 30 outputs a hold signal to the third APC filter circuit 28 in synchronization with a change of the write-on signal to a signal that specifies the recording operation, thereby holding the logic of the third APC filter circuit 28. Holding the logic of the third APC filter circuit 18 allows the initial value of the laser drive current "I4" for the reproduction following this recording to be set at the value of the laser drive current "I4" in the steady state during the preceding reproduction.

Furthermore, the light emission monitor signal "M2" is sampled and held in synchronization with the space sample pulse, and the second APC filter circuit 27 calculates the control data for correcting the light emission monitor signal "M2" to a desired value, and as a result, the laser drive current "I2" is corrected to a desired value. This correction is made on the assumption that the laser drive current "I4" has been held as the initial value for the following reproduction as described above.

Here, the laser drive currents "I1", "I2" and "I3" are set to meet the condition that I1:I2:I3=k1:k2:k3, where "k1", "k2" and "k3" are the scaling factors of the scaling-factor setting circuits 37, 38 and 39, respectively. As described above, the scaling factors "k1" to "k3" of the scaling-factor setting circuits 37 to 39 are indicated by the system controller 7. Then, when the control pulses 1 to 4 are turned on, the switching circuits 12 to 15 are turned on, and the laser drive current "I", which is the sum of the laser drive currents "I1" to "I4", is output.

Figure 12:
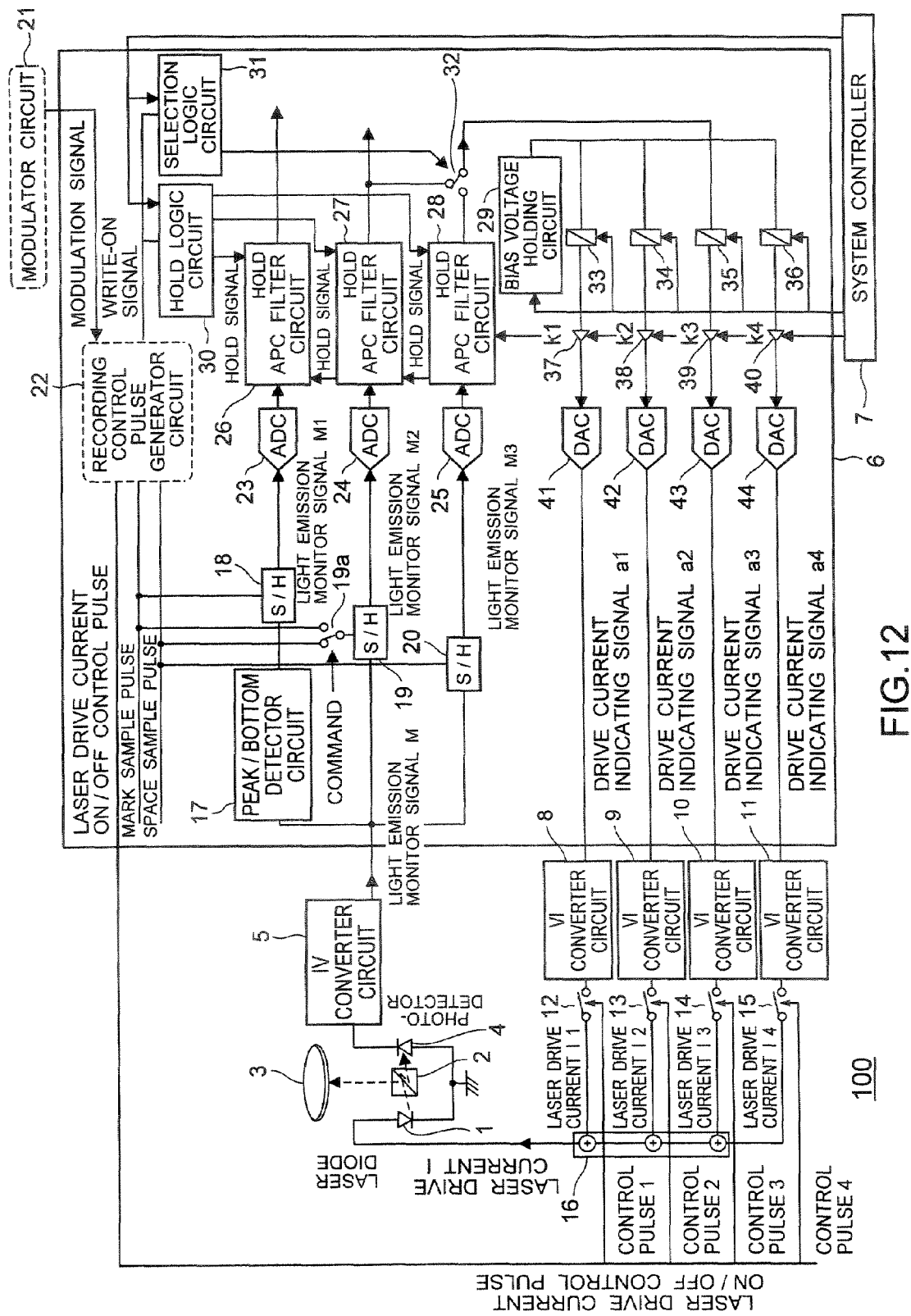
FIG. 12 shows an example 5 of modification of the laser-drive-current control circuit of the optical disk device according to the first embodiment, which is an aspect of the present invention.
Figure 13:
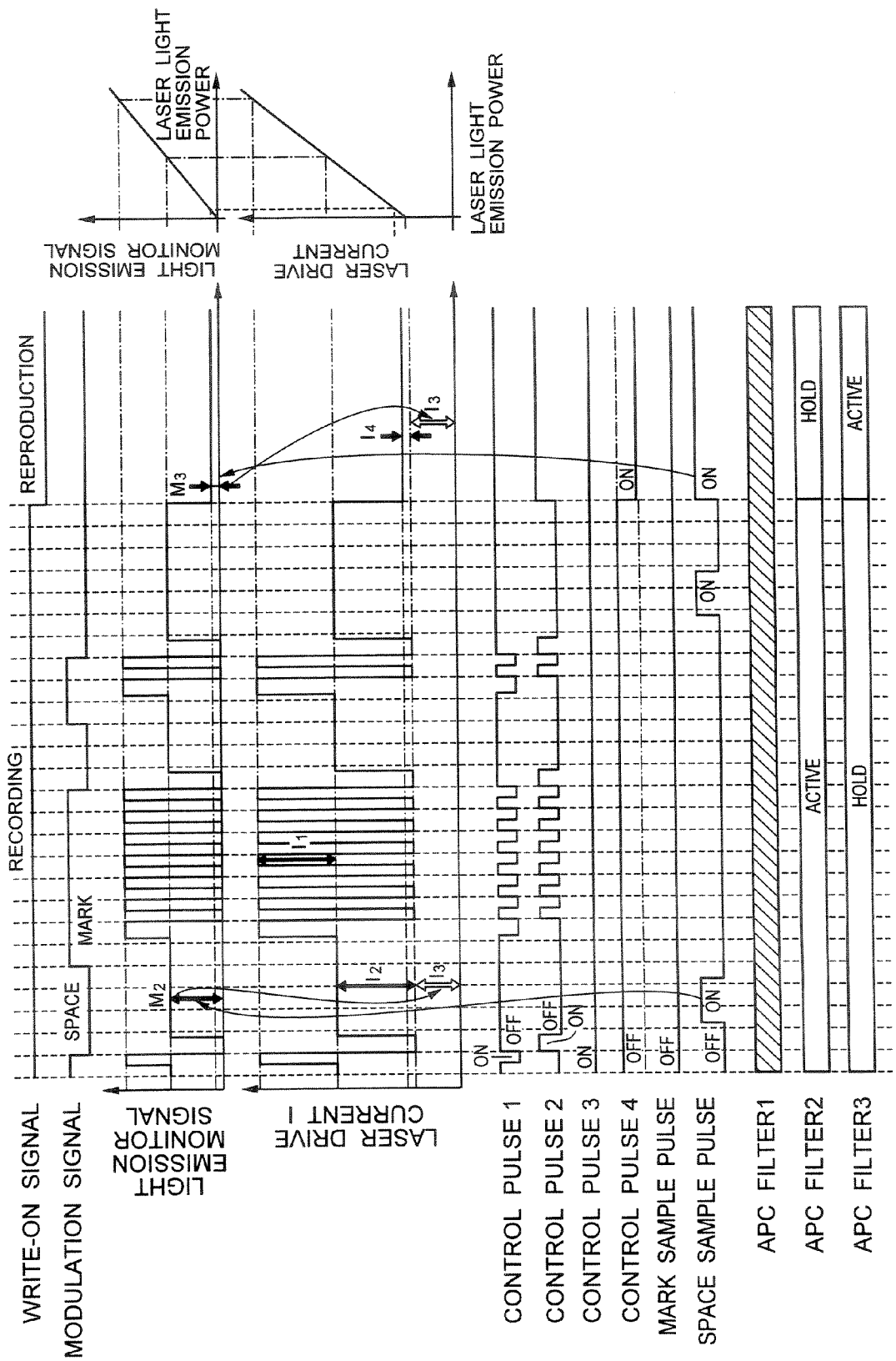
FIG. 13 is a diagram for illustrating the light emission monitor signal, the laser drive current and the waveforms of pulses for controlling the laser-drive-current control circuit shown in FIG. 12.

FIG. 12 shows an example 5 of modification of the laser-drive-current control circuit of the optical disk device according to the first embodiment, which is an aspect of the present invention. FIG. 13 is a diagram for illustrating the light emission monitor signal, the laser drive current and the waveforms of pulses for controlling the laser-drive-current control circuit shown in FIG. 12 (in the case of application to a DVD-RW).

As shown in FIG. 12, the system controller 7 controls the output selecting circuits 33 to 36 in such a manner that the output of the third APC filter circuit 28 is input to the output selecting circuit 35, and the output of the bias voltage holding circuit 29 is input to the output selecting circuits 33, 34 and 36. The switching circuit 19a is set so that the space sample pulse is input to the second sampling and holding circuit 19. Furthermore, the selection logic circuit 31 controls the switching circuit 32 to select the output of the second APC filter circuit 27 for recording and select the output of the third APC filter circuit 28 for reproduction.

If the connections in the laser-drive-current control circuit 6 are arranged in this way, when carrying out recording, the second APC filter circuit 27 calculates the control data for correcting the light emission monitor signal "M2" sampled and held by the second sampling and holding circuit 19 in synchronization with the space sample pulse to a desired value, thereby correcting the laser drive current "I3", and when carrying out reproduction, the third APC filter circuit 28 calculates the control data for correcting the light emission monitor signal "M3" sampled and held by the third sampling and holding circuit 20 in synchronization with the space sample pulse indicating the space positions to a desired value, thereby correcting the laser drive current "I3". These corrections are made on the assumption that the laser drive currents "I2" and "I4" are fixed to a desired value by the fixed bias voltage.

As shown in FIG. 13, if the write-on signal is a signal that specifies the recording operation, the light emission monitor signal "M2" is sampled and held in synchronization with the space sample pulse, the second APC filter circuit 27 calculates the control data for correcting the light emission monitor signal "M2" to a desired value, and as a result, the laser drive current "I3" is corrected to a desired value.

Since the third APC filter circuit 28 is not used during recording, the hold logic circuit 30 outputs a hold signal to the third APC filter circuit 28 in synchronization with a change of the write-on signal to a signal that specifies the reproduction operation, thereby holding the logic of the third APC filter circuit 28.

On the other hand, if the write-on signal is a signal that specifies the reproduction operation, the selection logic circuit 31 selects the output of the third APC filter circuit 28, the light emission monitor signal "M3" is sampled and held in synchronization with the space sample pulse, the third APC filter circuit 28 calculates the control data for correcting the light emission monitor signal "M3" to a desired value, and as a result, the laser drive current "I3" is corrected to a desired value.

Since the second APC filter circuit 27 is not used during reproduction, the hold logic circuit 30 outputs a hold signal to the second APC filter circuit 27 in synchronization with a change of the write-on signal to a signal that specifies the reproduction operation, thereby holding the logic of the second APC filter circuit 27.

Here, the laser drive currents "I1,", "I2" and "I4" are set to meet the condition that I1:I2:I4=k1:k2:k4, where "k1", "k2" and "k4" are the scaling factors of the scaling-factor setting circuits 37, 38 and 40, respectively. Then, when the control pulses 1 to 4 are turned on, the switching circuits 12 to 15 are turned on, and the laser drive current "I", which is the sum of the laser drive currents "I1" to "I4", is output.

As described above, the optical disk device according to this embodiment can flexibly control the laser power according to the type of the optical disk and carry out flexible reproduction and recording on each optical disk.

What is claimed is:

1. A laser-drive-current control circuit that outputs a drive current indicating signal for indicating a laser drive current for driving a laser light emitting element that emits a laser beam to an optical disk and controls the output of the laser drive current based on a light emission monitor signal, which depends on the output current of a photo-detector that measures the laser light emission power of said laser light emitting element, comprising:

a sampling and holding circuit that receives said light emission monitor signal, holds the light emission monitor signal for a predetermined time and then outputs the light emission monitor signal;

a recording control pulse generator circuit that generates and outputs a drive current on/off control pulse for controlling the output of the laser drive current at a desired timing and a sample pulse for controlling said sampling and holding circuit at a desired timing based on a modulation signal that specifies marks and spaces on said optical disk;

a plurality of automatic power control filter circuits that output control data for converging the output signal of said sampling and holding circuit on a desired value;

a hold logic circuit that outputs a signal for holding the logic of said automatic power control filter circuits in synchronization with a write-on signal that specifies recording and reproduction operations on said optical disk; and a bias voltage holding circuit that holds a fixed bias voltage for adjusting said laser drive current, wherein said automatic power control filter circuits hold the logics thereof according to the output signal of said hold logic circuit, and the laser-drive-current control circuit outputs a plurality of drive current indicating signals that indicate said laser drive current based on the output signals of said automatic power control filter circuits and a signal indicating said bias voltage held in said bias voltage holding circuit.

2. The laser-drive-current control circuit according to claim 1, further comprising:

a plurality of output selecting circuits that select from among the output signals of said plurality of automatic power control filter circuits and said signal indicating said bias voltage held in said bias voltage holding circuit and output the selected signal; and a plurality of scaling-factor setting circuits each of which outputs the output of the corresponding one of said output selecting circuits multiplied by a desired scaling factor, wherein the laser-drive-current control circuit outputs a plurality of drive current indicating signals that indicate said laser drive current based on each of the outputs of said plurality of scaling-factor setting circuits.

3. The laser-drive-current control circuit according to claim 1, wherein each of said automatic power control filter circuits comprises: an offset circuit that measures and stores an offset voltage of the output of said sampling and holding circuit at the time when said laser light emitting element does not emit light; an offset correction circuit that carries out offset correction by subtracting said offset voltage stored in said offset circuit from the output voltage of said sampling and holding circuit at the time when said laser light emitting element emits light; a first calculation circuit that compares the value obtained by the correction by said offset correction circuit with a reference value to calculate the error; an integrating circuit that integrates the error calculated by said first calculation circuit; and a second calculation circuit that adds a boost voltage value to the output of said integrating circuit and outputs the sum.

4. An optical disk device, comprising:

a laser light emitting element for emitting a laser beam to an optical disk;

a beam splitter that splits said laser beam;

an objective lens for applying part of said split laser beam to said optical disk;

a photo-detector that receives part of said split laser beam and measures the laser light emission power of said laser light emitting element;

an IV converter circuit that converts the output current of said photo-detector into a light emission monitor signal;

a laser-drive-current control circuit that outputs a drive current indicating signal for indicating a laser drive current for driving the laser light emitting element and controls the output of the laser drive current based on a light emission monitor signal, comprising: a sampling and holding circuit that receives said light emission monitor signal, holds the light emission monitor signal for a predetermined time and then outputs the light emission monitor signal; a recording control pulse generator circuit that generates and outputs a drive current on/off control pulse for controlling the output of the laser drive current at a desired timing and a sample pulse for controlling said sampling and holding circuit at a desired timing based on a modulation signal that specifies marks and spaces on said optical disk; a plurality of automatic power control filter circuits that output control data for converging the output signal of said sampling and holding circuit on a desired value; a hold logic circuit that outputs a signal for holding the logic of said automatic power control filter circuits in synchronization with a write-on signal that specifies recording and reproduction operations on said optical disk; and a bias voltage holding circuit that holds a fixed bias voltage for adjusting said laser drive current, wherein said automatic power control filter circuits hold the logics thereof according to the output signal of said hold logic circuit, and the laser-drive-current control circuit outputs a plurality of drive current indicating signals that indicate said laser drive current based on the output signals of said automatic power control filter circuits and a signal indicating said bias voltage held in said bias voltage holding circuit;

a system controller that controls said laser-drive-current control circuit to make the laser-drive-current control circuit output a plurality of desired drive current indicating signals;

a VI converter circuit that converts said plurality of drive current indicating signals into a plurality of laser drive currents;

a plurality of switching circuits that turn on and off the plurality of laser drive currents according to a drive current on/off control pulse output from the recording control pulse generator circuit in said laser-drive-current control circuit; and an adder that sums the laser drive currents output via said switching circuits and outputs the sum to said laser light emitting element.

5. The optical disk device according to claim 4, wherein the laser-drive-current control circuit further comprises:

a plurality of output selecting circuits that select from among the output signals of said plurality of automatic power control filter circuits and said signal indicating said bias voltage held in said bias voltage holding circuit and output the selected signal; and a plurality of scaling-factor setting circuits each of which outputs the output of the corresponding one of said output selecting circuits multiplied by a desired scaling factor, wherein the laser-drive-current control circuit outputs a plurality of drive current indicating signals that indicate said laser drive current based on each of the outputs of said plurality of scaling-factor setting circuits.

6. The optical disk device according to claim 4, wherein each of said automatic power control filter circuits comprises: an offset circuit that measures and stores an offset voltage of the output of said sampling and holding circuit at the time when said laser light emitting element does not emit light; an offset correction circuit that carries out offset correction by subtracting said offset voltage stored in said offset circuit from the output voltage of said sampling and holding circuit at the time when said laser light emitting element emits light; a first calculation circuit that compares the value obtained by the correction by said offset correction circuit with a reference value to calculate the error; an integrating circuit that integrates the error calculated by said first calculation circuit; and a second calculation circuit that adds a boost voltage value to the output of said integrating circuit and outputs the sum.

\* \* \* \* \*